Oct. 7, 1941.  W. F. HEROLD  2,258,359
WHEEL MOUNTING
Filed Dec. 21, 1939   2 Sheets-Sheet 1

Inventor
Walter F. Herold,
By Rockwell Bartholow
Attorneys

Oct. 7, 1941.    W. F. HEROLD    2,258,359
WHEEL MOUNTING
Filed Dec. 21, 1939    2 Sheets-Sheet 2
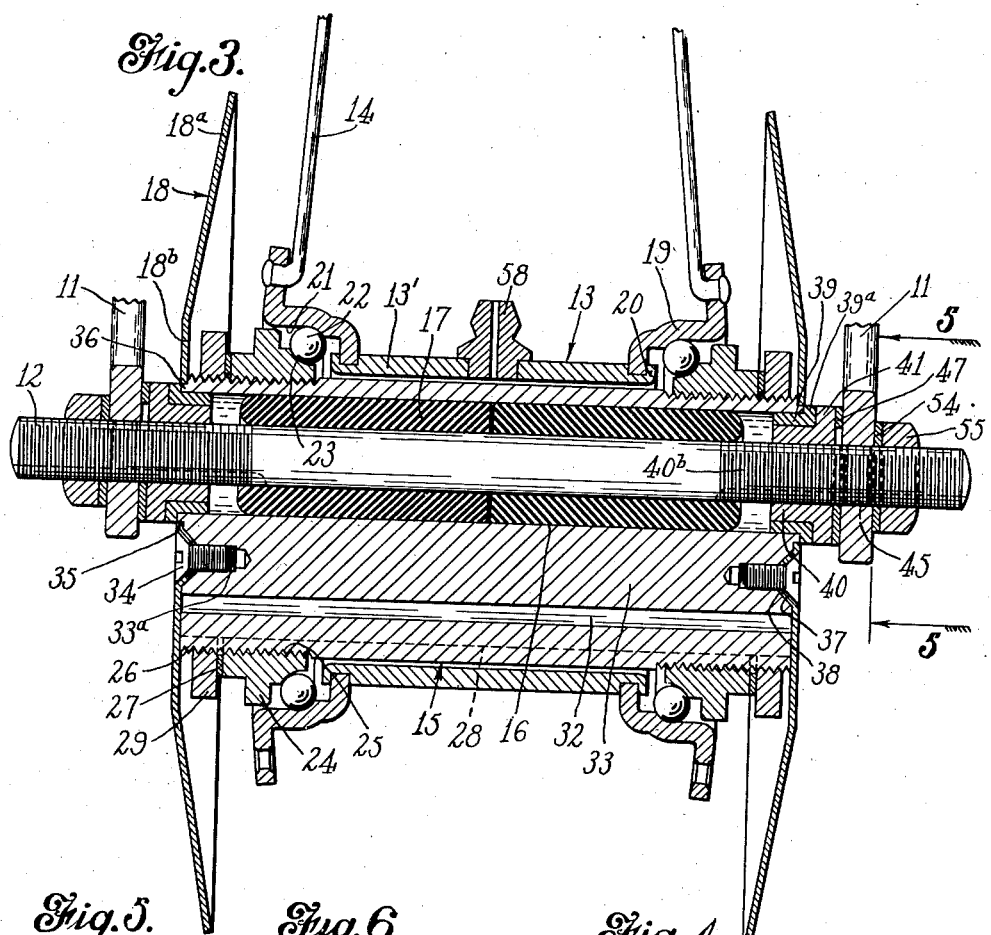
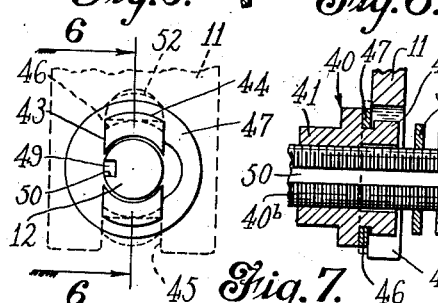
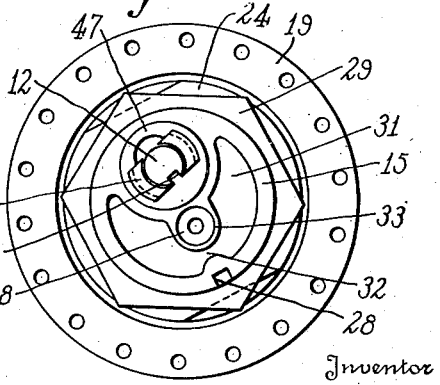
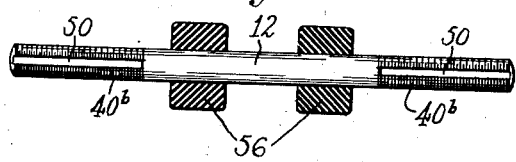
Inventor
Walter F. Herold,
By Rockwell & Bartholow
Attorneys Patented Oct. 7, 1941

2,258,359

UNITED STATES PATENT OFFICE 2,258,359

WHEEL MOUNTING

Walter F. Herold, Bridgeport, Conn., assignor to The Bassick Company, Bridgeport, Conn., a corporation of Connecticut Application December 21, 1939, Serial No. 310,406

23 Claims. (Cl. 301—136)

This invention relates to wheel mountings, and it has special reference to a resilient wheel mounting for bicycles. More particularly the invention relates to a wheel mounting intended primarily for use in connection with the front wheels of bicycles.

One of the objects which I have in view is the provision of improved means for taking up shocks encountered by the front or steering wheels of bicycles, thus furnishing for bicycles what is in effect a knee-action device, permitting the front wheel to rise against the action of a suitably tensioned elastic or resilient member in order to pass over bumps and roughness in the road.

Another object is to provide a device of this nature which enables the bicycle to be propelled more comfortably and with less expenditure of effort.

Another purpose which I have in view is the provision of a resilient mounting applicable to standard bicycles without necessitating any major changes in their construction.

Another desirable feature of my improved device is that it is of practically fool-proof construction, and after being adjusted at the factory cannot readily be tampered with so as to injure it or render its operation less satisfactory.

To these and other ends the invention consists in the novel features and combinations of parts to be hereinafter described and claimed.

In the accompanying drawings:

Fig. 3 is an enlarged section on line 3—3 of Fig. 1;

Fig. 4 is an end elevation showing certain parts appearing in Fig. 3, other parts being omitted;

Fig. 5 is a section on line 5—5 of Fig. 3;

Fig. 6 is a section on line 6—6 of Fig. 5;

Fig. 7 is a detail of the axle and the rubber blocks provided thereon showing the axle as it appears before assembly;

Figure 1:
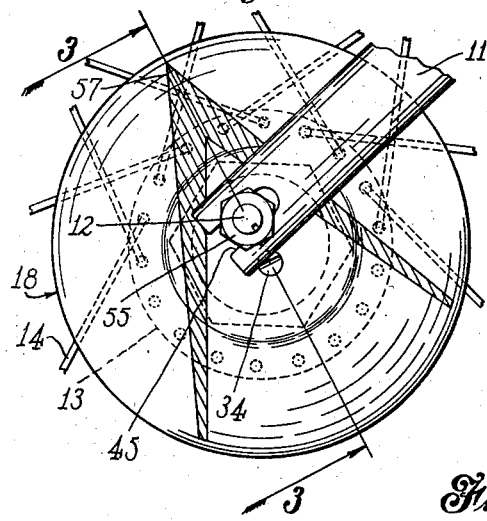
Fig. 1 is a side elevation of a bicycle front wheel mounting embodying my improvements, showing the parts as they appear when the wheel is free of load, as for example where it is lifted off the ground.

In the drawings I have shown a preferred form of knee-action device such as employed in connection with the front fork of a bicycle. In the drawings the fork is shown at 11 and the wheel axle at 12. The fork is or can be of standard form and is swivelled in the usual manner to turn about an axis forwardly and downwardly inclined. The wheel has a hollow hub 13 to the ends of which are connected the usual wire spokes 14. The hub 13 accommodates a cylindrical body 15 mounted in the hub by anti-friction bearings in the manner hereinafter described. This body 15 has a longitudinal eccentrically located bore 16 through which the axle 12 extends, and body 15 is mounted to oscillate with respect to axle 12 against the resistance of a tensioned body or mass 17 of rubber or other elastic material. To the ends of the cylindrical body 15 are applied disk-like guard members 18 of extended area which function in the manner hereinafter described, these members being located in the spaces between the inner faces of the fork and the ends of the hub structure.

Figure 9:
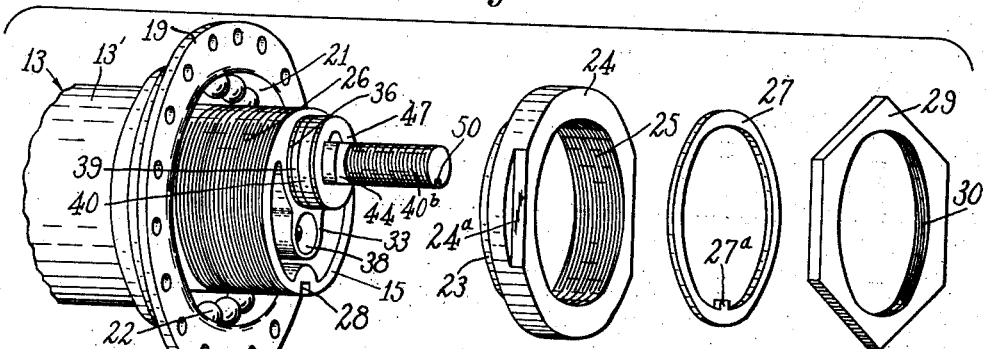
Fig. 9 is an exploded perspective view showing the hollow hub, the cylindrical body, and parts for securing the body in the hub.

Referring now to the details, it will be observed that the hub 13 comprises three parts, namely, a central tubular part 13', and end bearing cups 19 whose inner ends may be secured to the ends of member 13' in a suitable manner, as by swaging, the swaged connection being indicated at 20. The cups 19 are provided with inner faces 21 for seating anti-friction balls 22, and the anti-friction balls 22 are contacted by curved race portions 23 at the inner ends of bearing retainers 24. The bearing retainers 24 have internal threads 25 engaging external threads 26 on the cylindrical body 15, and the retainers can be screwed up on the cylindrical body to position the balls 22 with a proper amount of play in order that the wheel hub may be mounted for free rotation on the cylindrical body 15. The retainers 24 are provided at the sides with flattened portions or shoulders 24ª, best shown in Fig. 9, so that by the use of a suitable tool these retainers can be readily screwed into position. After being screwed into position each retainer has a washer 27 set against its outer face, this washer being provided with an inwardly projecting lug 27ª adapted to enter a peripheral notch 28 at the end of body 15. A hexagonal or like nut 29, having internal screw threads 30, screws up on threaded portion 26 against washer 27. This nut acts as a lock nut to prevent retainer 24 from being jarred out of adjustment.

In order to save weight, the body 15 is preferably formed as a die casting cored out to provide longitudinal voids 31 on opposite sides of the center, these voids preferably communicating with each other by means of a space 32, shown in Fig. 4. Between the voids 31 the casting has a central longitudinal projection 33, and at the ends this projection is drilled and tapped at 33ª to receive flat-headed machine screw 34 by means of which the guard members 18 are held in place on the ends of the cylindrical body.

Figures 10, 11:
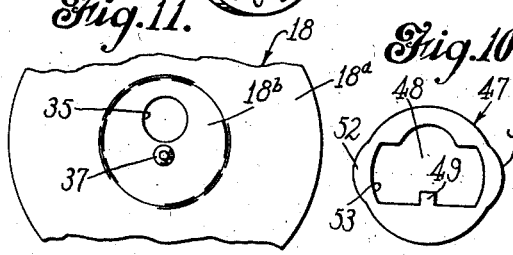
Fig. 10 is a detail of the lock washer for the adjusting nut associated with the fork.
Fig. 11 is a fragmentary inside face view of one of the guard members on a reduced scale.

It will be observed that the members 18 are preferably somewhat dished so as to provide a cross-section that is concavo-convex, the convexity being toward the outer side of the wheel. It will be noted, moreover, that the lock nuts 29, previously mentioned, are located closely adjacent the ends of member 15, while members 18 are placed against the end faces of body 15. Thus as the members 18 are of relatively extended area, having in practice a diameter of say four and a half inches, while the nuts 29 have a diameter of say one and two-thirds inches, and as the members 18 have inwardly bent rim portions 18ª, the nuts 29 are well housed and protected by members 18. Furthermore, tampering with the lock nuts 29 by unauthorized persons is rendered less likely. Preferably each guard member has a body 18ᵇ lying in a single plane and abutted against the adjacent end face of member 15, the portions 18ª being inclined at a slight angle, as shown. The guard member is of substantially larger diameter than the adjacent spoke-receiving flange on the hub which is the hub portion of maximum diameter. As shown in Fig. 11, the guard member is positioned relatively to member 15 by having an opening 35 eccentric to the guard member engaging a shouldered portion 36 at the end of body 15 around the bore 16, and a countersink-providing perforated inwardly depressed portion 37 fitting a countersink 38 at the mouth of socket 33ª. This depressed portion is adapted to receive the machine screw 34. The single screw at each end of the wheel hub will prevent the rotation of the guard member relatively to body 15 and secure the guard member firmly in position.

At each end of the axle 12 the same is supported centrally in bore 16 by means now to be described. Fitting within the open end of the bore is a self-lubricating bushing 39 of graphite bronze or similar material having a body which projects into the bore 16 to a certain extent, and having an integral out-turned flange 39ª which extends over the mouth of the bore and engages the end face of body 15. The bushing 39 receives and is interiorly supported by an adjusting nut 40 having threads 40ª engaging threads 40ᵇ provided on the end portion of the axle. The nut 40 is placed adjacent the inner face of the adjacent fork leg. This adjusting nut 40 preferably has the special conformation best shown in Figs. 3, 5, 6 and 8. It has a body 41 on which the bushing 39 is mounted, and at its forward end portion it is provided with a flange 41 of round formation against which rests the flange of the bushing. In front of the round flange 41 the nut has a projecting squared-off portion or spline 42 having parallel sides 43 and rounded ends 44. The parallel sides 43 of this projecting portion are adapted to fit a slot 45 in the end of the fork leg, so that the nut and fork leg are non-rotatively engaged with each other. The manner in which squared-off portion 42 engages the slotted fork is shown in Figs. 5 and 6.

After the nut has been adjusted to provide for rotation of body 15 in the proper manner, it can be locked in place at the factory so as to prevent subsequent tampering therewith, and the preferred manner of effecting this result is as follows: The squared-off portion 42 is provided at the ends, adjacent the flange 41, with arcuate grooves 46. These are adapted to be engaged by a lock washer 47, shown in detail in Fig. 10. Initially the washer 47 has the form shown in Fig. 10, and it is provided with an opening 48 which enables it to be slipped over the squared-off projection of the adjusting nut. Extending inwardly into the opening 48 is a small lug 49 which engages a longitudinal groove 50 in the end portion of the axle so as to prevent the rotation of the washer relatively to the axle. Initially the washer has diametrically opposite portions 51 presenting bumps or projections 52 at the periphery of the washer. After the nut has been properly adjusted on the axle, however, and the washer placed in position, the washer is deformed by having its bumps 52 pressed inwardly or radially, the effect of which is to bring portions of the washer, indicated at 53 in Fig. 10, into locking engagement with the grooves 46, previously mentioned. The nut, therefore, cannot be further adjusted without breaking the washer, and the manner of releasing the nut is not obvious. The washer is at the rear of the fork engaging portion of the nut, which is a somewhat protected location, and the outer edge of the washer is smooth and round. The nut is held against turning by the engagement of lug 49 in the groove of the axle, and the washer, after being deformed, cannot be moved axially relatively to the nut. As the nut is non-rotatively engaged with the fork, the axle, which is the inner member of the torsion joint, is held stationary. On the outer end of the axle the customary lock washer 54 and the customary nut 55 are employed, the fork leg being held between these members and the adjusting nut.

The rubber mass or body 17 previously mentioned is preferably a duplex body. Before assemblage the axle has the appearance shown in Fig. 7, the middle portion having bonded thereto round rubber blocks 56, which are spaced from each other to a substantial extent. The rubber bodies 56 are bonded to the axle as by being vulcanized thereon. In the assemblage, the members 56 are forced into the bore 16 under great pressure, reducing the diameter of the rubber bodies substantially and deforming them so that at their inner ends they are approximately in contact, as shown in Fig. 3. The rubber is substantially bonded to the inner surface of the bore 16 by reason of the compressing and stressing of the rubber by being placed in the bore, which causes a very considerable surface friction to be created between the bore wall and the rubber. While the rubber body is extended in the bore so that it is adjacent the ends of the bore, it is preferred to have the extremities of the rubber body spaced inwardly to some extent from the members closing the ends of the bore, as shown in Fig. 3.

Figure 2:
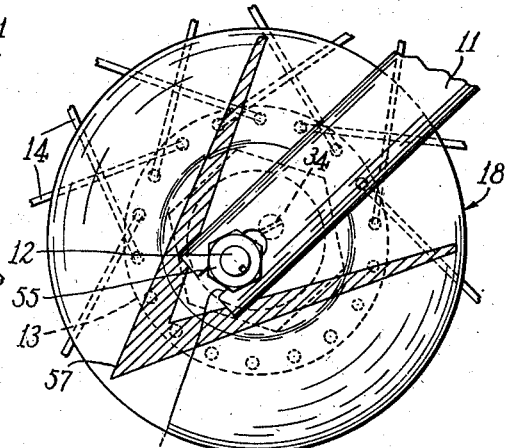
Fig. 2 is a similar view showing the position of the parts under substantial load, as when the wheel rolls over a sharp bump or upward projection in the road.
Figure 8:
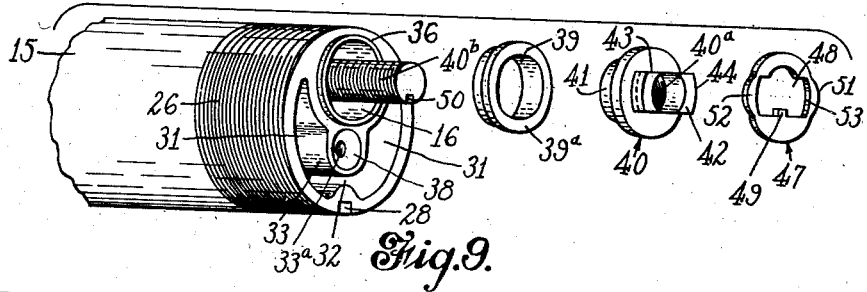
Fig. 8 is an exploded perspective view of the rubber-containing cylindrical block or body and certain parts in association therewith.

It is believed that the manner of assembling the device will be apparent for the most part from the foregoing description. In assembling the axle and rubbers with the hub, the axle is forced into place by the use of an hydraulic press, a funnel-shaped guide being employed to facilitate insertion, and the rubber mass being suitably lubricated, as by application of a lubricant which will later be absorbed. It will be evident that with the axle 12 acting as a fixed axis, the body 15 is free to turn about the axis, this being resisted by the rubber body, which is under heavy stress, and which provides a quick build-up of counter-pressure as the body 15 is turned relatively to the axis. This will enable the front wheel of the bicycle to pass over bumps, stones and the like, more easily and comfortably than heretofore, as the shocks are well taken up in the rubber of the torsion joint. Preferably the parts will be so arranged that when the bicycle wheel is lifted off of the road and is entirely free from load, the parts will have a position such as indicated in Fig. 1, from which it will be observed that that portion of body 15 which is of greatest radial measurement from the axle axis is below the axis and very slightly to the rear thereof. When the wheel is placed on the road so as to carry weight, there will be a turning movement of the body 15 in a counter-clockwise direction (Fig. 1) to a certain extent. And, in running against a sharp bump or projection and subjecting the wheel to suddenly increased load, there will be a further deflection of the body 15, say to a position such as shown in Fig. 2. After the bump has been passed, the parts are restored in an obvious manner to the normal running position. As the body 15 is deflected, the wheel rises so as to have a sort of knee action. Fig. 2 shows the wheel raised, but not at the upper limit of its movement. It will be understood that the wheel will accommodate itself to the road and to changes of load, changing its position constantly. In a bicycle, the amplitude of vertical cushioned movement of the wheel may be of the order of one inch, for example.

It will be understood that the body member 15 turns on the bushing 39, and that therefore the bearing for the body member provided by the inner member or axle is self-lubricated and requires no attention for long periods. The ball bearings for the wheel hub can be lubricated from an oil nipple 58 carried by the portion 13'. Obviously no lubrication of the torsional joint will be required. In operation the device will be free of any objectionable noise.

The guard members 18 not only serve to prevent tampering with the bearings between the body member and the wheel hub or shell, as previously described, but they serve to enclose and protect from splashing and the like, various parts at the ends of the hub structure. As these guard members are fixed to the body member in which the rubber is confined, they may also serve as a means for indicating visually the fact that the device is in good operating condition. What I prefer to do, and what I consider distinctly advantageous, is to provide the outer face of each guard member or disk with a visual indication adjacent the periphery thereof which will be turned or oscillated as the device operates, and will be readily seen. For example, I may apply to the outer face of the disk by means of colored enamel, for example, a pointer-like indication having an indicating mark or pointer such as shown in the drawings, which mark or pointer may have a pointing indication 57 adjacent the periphery of the disk at at least one point. If, for example, the disk has a chromium finish, and a pointer indication is provided by applying thereto a dark enamel, the pointer will be readily visible. Owing to the fact that the disk is of relatively large diameter so that its travel at the periphery thereof is greatly in excess of the up and down movement of the cylindrical body and the wheel, there will be an amplified indication, moreover, of the up and down movement, and hence when the device is functioning properly, that fact will be visually indicated by the amplitude of the arcs through which the pointer travels.

While in the drawings the pointer is provided by placing on the disk a V-shaped figure, many and various other ways of securing the desired result will suggest themselves.

A device such as herein described not only softens road shocks, but also has the important advantage of reducing the amount of power required to propel the bicycle, owing to the fact that a bicycle provided with such a device will be more readily pushed over a sharp bump or obstacle. The front wheel has no propelling power applied to it directly, and therefore in the ordinary construction of bicycle a considerable amount of power is required to push the front wheel over a bump. According to the present invention the impact of the wheel against a bump or projection causes the wheel to be deflected or swung in an upward and rearward direction, which greatly expedites the travel of the machine, while at the same time adding to the comfort of the rider.

The use of rubber in the torsional joint enables the reaction pressure to be built up very rapidly in a relatively small amplitude of movement.

It will be apparent that in using my improvement the main parts of the bicycle may be of a standard type, the chief modifications necessary being in the hub structure of the front wheel. My improvements can, therefore, be readily incorporated in present day bicycles. In some cases the slotting of the fork ends is not necessary.

It will now appear from the description that I have provided a torsional joint of which the inner member is the axle proper which directly carries the rubber block or blocks that act as the intermediate, resilient member, while the outer member is constituted by the cylindrical body having the eccentric bore for the rubber mass and the axle. The cylindrical body is mounted for rotation in a hollow hub or shell having end members which provide races for ball bearings the other races of which are carried by members screwing up on the ends of the cylindrical body and protected by the disk-like guard members. The outer member of the torsional joint has a bearing on the inner member thereof provided by the bearing ring, the bearing being within the ends of the eccentric bore, and being supported interiorly by the adjusting nut, the ends of the eccentric bore being closed by members which are adjustable. It is of advantage to have the inner member of the joint a solid member acting as the axle proper. The end closing members for the eccentric bore are non-rotatably engaged with the axle (for example, by a lock washer such as 47), and thus by non-rotatively engaging the adjustable bearing or closure members with the supporting fork by means such as slots provided in the fork ends, the axle is held stationary in the fork so as to act as the fixed or stationary member of the joint.

It is an advantage that the guard members are independent of the bearings which they enclose and protect, and can be secured in position on the ends of the cylindrical body after the bearings have been set up and the spokes have been attached to the hub. The means for attaching the guard member to the cylindrical body is simple and effective.

Although I have shown herein only one form of the improved device, it will be understood that many modifications and changes in the organization of parts and in the details may be made without departing from the principles of my invention or the scope of the claims.

What I claim is:

1. In a wheel mounting, a torsion joint comprising an inner member, an outer member, and an intermediate member constituted by a body of rubber confined between the other members under high compression and stress, said outer member having an eccentric bore in which the rubber is disposed, said inner member being constituted by a solid axle member to which the rubber is directly vulcanized, journals for said outer member carried by said axle member in the ends of said bore, and a wheel hub structure in which the outer member is mounted to turn.

2. In a wheel mounting, a torsion joint comprising an inner member, an outer member, and an intermediate member constituted by a body of rubber confined between the other members under high compression and stress, said outer member having an open-ended eccentric bore in which the rubber is disposed in elongated sleeve form, said inner member being constituted by a solid axle member to which the rubber is directly vulcanized, means confining said body of rubber against displacement from the bore ends, said means providing endwise adjustable bearings for the end portions of said outer member, and a wheel hub structure mounted to turn on the outer member.

3. In a wheel mounting, the combination of a torsion joint comprising inner, intermediate and outer members, the inner member being the wheel axle and the intermediate member being a body of rubber closely confined in an eccentric longitudinal bore in the outer member, a hollow wheel hub within which the outer member is disposed, and ball bearings having race members carried respectively by the ends of the hub and the ends of the outer member, said outer member having within the ends of the eccentric bore and adjacent the ends of said rubber body thrust bearings by which it is supported from said inner member.

4. In a wheel mounting, a torsion joint comprising inner, intermediate and outer members, the inner member being constituted by a solid axle, the intermediate member being constituted by a body of rubber bonded to said axle, and the outer member being constituted by a cylindrical body having an eccentric longitudinal bore in which the other members of the joint are disposed, a wheel hub mounted to rotate about said outer member, and self-lubricating bearings for said outer member within the end portions of the eccentric bore comprising bushings supported from said inner member in radially outwardly spaced relation thereto.

5. In a wheel mounting, a torsion joint comprising inner, intermediate and outer members, the inner member being constituted by a solid axle, the intermediate member being constituted by a body of rubber bonded to said axle, and the outer member being constituted by a cylindrical body having an eccentric longitudinal bore in which the other members of the joint are disposed, a wheel hub mounted to rotate about said outer member, and bearings for said outer member within the end portions of the eccentric bore adjacent the ends of the rubber body supported from said inner member, said bearings comprising axially adjustable self-lubricating bushings.

6. In a wheel mounting, a torsion joint comprising inner, intermediate and outer members, the inner member being constituted by an axle, the intermediate member being constituted by a rubber body bonded to said axle, and the outer member being constituted by a cylindrical body having an eccentric longitudinal bore in which the other members are disposed, and adjustable means on the axle closing the ends of the bore.

7. In a wheel mounting, a torsion joint comprising inner, intermediate and outer members, the inner member being constituted by an axle, the intermediate member being constituted by a rubber body bonded to said axle, and the outer member being constituted by a cylindrical body having an eccentric longitudinal bore in which the other members are disposed, adjustable means on the axle closing the ends of the bore, said means including bushings engaging the internal surface of the bore and adjusting nuts on the axle interiorly supporting the bushings.

8. In a wheel mounting, a torsion joint comprising inner, intermediate and outer members, the inner member being constituted by an axle, the intermediate member being constituted by a rubber body bonded to said axle, and the outer member being constituted by a cylindrical body having an eccentric longitudinal bore in which the other members are disposed, adjustable means on the axle closing the ends of the bore, said means including bushings engaging the internal surface of the bore and adjusting nuts on the axle interiorly supporting the bushings, said adjusting nuts having provisions by which they are non-rotatively locked to the axle.

9. In a wheel mounting, a torsion joint including an axle, a body of rubber bonded thereto, and a cylindrical member having an eccentric longitudinal bore in which said axle and said rubber body are disposed, a wheel hub mounted to turn about the cylindrical body, said axle having at the end a longitudinal groove, a bearing in the end of the bore, an adjusting nut having threads engaging threads on the axle, a fork member having a slotted end engaging a flattened-off projection on the adjusting nut, and a lock washer for the adjusting nut having a lug engaging the longitudinal axle groove, said lock washer being deformable to lock the nut permanently after adjustment.

10. In a wheel mounting, an axle member, a rubber body bonded to the axle member, a cylindrical body having an eccentric longitudinal bore in which said axle member and said rubber body are disposed, adjustable bearing members in the end portions of the bore providing for the rotation of the cylindrical body relatively to the axle, means for supporting the bearing members, and means for fixing said bearing members in position after they have been adjusted.

11. In a wheel mounting of the torsion joint type in which there is an inner axle member and an outer member having an eccentric bore for receiving the inner member, an adjustable closure member movable on said inner member into position at the end of said bore, and means deformable after adjustment of said member and there-after unreleasable without breakage for holding it permanently in the adjusted position.

12. In a wheel mounting, an axle member, a rubber body bonded to the axle member, a cylindrical body having an eccentric longitudinal open-ended bore in which said axle member and said rubber body are disposed, the rubber body terminating short of the ends of the bore, adjustable hollow bearing members surrounding the axle in the end portions of the bore spaced outwardly from the axle and providing for the rotation of the cylindrical body relatively to the axle, means for interiorly supporting and adjusting said bearing members, and means for preventing movement of said last-named means after the same has been adjusted.

13. In a wheel mounting, a torsion joint comprising an inner member, an outer member, and an intermediate member constituted by a body of rubber confined between the other members under high compression and stress, said outer member having an eccentric bore in which the rubber is disposed, said inner member being constituted by an axle member to which the rubber is directly vulcanized, journals for said outer member carried by said axle member in the ends of said bore, a wheel hub structure in which the outer member is mounted to turn, and disk-like shield members applied to the ends of said outer member around said journals.

14. In a wheel mounting, a torsion joint comprising an inner member, an outer member, and an intermediate resilient member confined between the other members, said outer member having an eccentric bore in which the resilient member is disposed, journals for said outer member carried by said inner member in the ends of said bore, a wheel hub structure in which the outer member is mounted to turn, and disk-like shield members attached to the ends of said outer member disposed around said journals, said members extending laterally outward substantially past the hub portion which is of maximum diameter, and being intended to be visible from the outer side of the wheel when the device is in operation for giving an amplified indication of the cushioned movement.

15. In a wheel mounting, a torsion joint comprising an inner member, an outer member, and an intermediate resilient member confined between the other members, said outer member having an eccentric bore in which the resilient member is disposed, journals for said outer member carried by said inner member in the ends of said bore, a wheel hub structure in which the outer member is mounted to turn by means of end ball bearings, and members carried at and by the end portions of said outer member which are intended to be visible from the outer side of the wheel when the device is in operation to give an amplified indication of the cushioned movement, said last-named members being mountable and demountable independently of said ball bearings and said journals.

16. In a wheel mounting, a torsion joint comprising an inner member, an outer member, and an intermediate resilient member confined between the other members, said outer member having an eccentric bore in which the resilient member is disposed, a supporting fork, means for setting said inner member in said fork in a predetermined angular adjustment, a wheel hub structure in which the outer member is mounted to turn by means of end ball bearings, said wheel hub structure having spoke-attaching flanges, and shielding members of concavo-convex form having their convex faces outermost carried at the ends of said outer joint member independently of said ball bearings, said shielding members being of larger diameter than said spoke-attaching flanges and having on their outer faces indicating means intended to be visible from the side of the wheel when the device is in operation for giving an amplified indication of the cushioned movement.

17. In a wheel mounting, a torsion joint comprising an inner member, an outer member, and an intermediate resilient member, said inner member being constituted by an axle, journals for said outer member carried by said axle, means fixed on the axle engaging and supporting said journals, a wheel hub structure in which the outer member is mounted to turn, and a supporting fork having engagement with said fixed means such that the torsion joint is mounted in the fork in a predetermined angular relation.

18. In a wheel mounting, a torsion joint comprising an inner member, an outer member, and an intermediate resilient member, said inner member being constituted by an axle, journals for said outer member carried by said axle, nuts fixed on the axle engaging and supporting said journals, a wheel hub structure in which the outer member is mounted to turn having spoke-attaching flanges, a supporting fork having engagement with said nuts such that the torsion joint is mounted in the fork in a predetermined angular relation, and means mounted around said journals and visible from the side of the wheel for giving an amplified indication of the cushioned movement comprising disk-like shield members carried by the ends of the outer member of the torsion joint around the journals extending laterally beyond the spoke-attaching flanges of the hub.

19. In a wheel mounting, a torsion joint comprising an inner axle member, an outer member, and an intermediate resilient member confined between the first two members, a wheel hub surrounding the outer member, ball bearings mounting the wheel hub for rotation with respect to said outer member each comprising race members, certain of said race members being screwed on the end portions of said outer joint member, said ball bearings further including locking means for said last-named race members, and shield members applied to the ends of the outer joint member and mountable and demountable without disturbing said locking means.

20. In a wheel mounting, the combination of a fixed axle, a hollow wheel hub, a torsion joint interposed between the axle and the wheel hub permitting an upward cushioned movement of the wheel through a predetermined distance, means for obtaining an amplified visual indication of the cushioned movement comprising a member associated with the outer portion of the torsion joint which is oscillated in arcs of relatively large radius, and means cooperating with an external support for locating said member in a predetermined angular initial adjustment.

21. In a wheel mounting, a torsion joint comprising an inner axle member, an outer member, and a resilient intermediate member, a wheel hub surrounding the outer member, ball bearings mounting said wheel hub for rotation with respect to said outer member comprising raceways carried by the hub and other raceways screwed on the ends of the outer member, fastening means for the last-mentioned raceways screwed on the ends of the outer member, and shield members carried by the outer member at its ends in juxtaposition to said fastening means so as to enclose the same, said shield members having inwardly directed portions conforming generally to the shape of the wheel at the sides of the wheel.

22. In a wheel mounting, a torsion joint having an inner or axle member, an intermediate resilient member and an outer member to which the others have an eccentric location, a wheel hub turning on the outer member, a supporting fork, means of engagement between the fork and the torsion joint whereby the joint when assembled with the fork always has a predetermined angular relation to the latter, and shielding members fixed on the ends of the outer joint member and in fixed angular relation to said member, said shielding members being of such size and visual characteristics as to give an amplified indication of the movement of the torsion joint.

23. In a wheel mounting, the combination of a fixed axle, a hollow wheel hub, a torsion joint structure including an outer member supporting the wheel hub from the axle and permitting a cushioned upward movement of the wheel under shock, and means associated with the wheel for visually indicating when the cushioned movement takes place, said means including a relatively large disk-like bearing-shielding and wheel-shielding member adjacent the end of the wheel hub provided on the outer face of said member adjacent the peripheral portion thereof with visual indication means and having a predetermined angular relation to the outer member of the joint.

WALTER F. HEROLD.